(12) United States Patent
Nan et al.

(10) Patent No.: US 9,628,326 B2
(45) Date of Patent: Apr. 18, 2017

(54) MANAGING NETWORK CONNECTION OF A NETWORK NODE

(71) Applicant: International Business Machines Corporation, Armonk, NY (US)

(72) Inventors: Jun Jie Nan, Beijing (CN); Hong Jun Tu, Beijing (CN); Jeffrey Jie Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 14/515,635

(22) Filed: Oct. 16, 2014

(65) Prior Publication Data

US 2015/0113112 A1 Apr. 23, 2015

(30) Foreign Application Priority Data

Oct. 17, 2013 (CN) .......................... 2013 1 0487665

(51) Int. Cl.
*G06F 15/173* (2006.01)
*H04L 12/24* (2006.01)
(52) U.S. Cl.
CPC ................................ *H04L 41/0659* (2013.01)
(58) Field of Classification Search
USPC ................................. 709/223, 224, 238, 239
See application file for complete search history.

(56) References Cited

U.S. PATENT DOCUMENTS

| | | | |
|---|---|---|---|
| 5,864,653 A * | 1/1999 | Tavallaei | G06F 11/0745 710/110 |
| 6,134,678 A | 10/2000 | Mahalingam et al. | |
| 7,760,619 B2 | 7/2010 | Abdulla et al. | |
| 7,934,020 B1 | 4/2011 | Xu et al. | |
| 9,237,034 B2 * | 1/2016 | Huang | G06F 11/2005 |
| 2005/0058063 A1 * | 3/2005 | Masuyama | H04L 41/0663 370/217 |

(Continued)

FOREIGN PATENT DOCUMENTS

WO WO2010045709 A1 4/2010

OTHER PUBLICATIONS

Dow et al., "A Reference Implementation Architecture for Deploying a Highly-Available Networking Infrastructure for Cloud Computing and Virtual Environments using OSPF," IBM Corporation, Dec. 2009, 44 pages.

(Continued)

*Primary Examiner* — Liangche A Wang
(74) *Attorney, Agent, or Firm* — Yee & Associates, P.C.; Richard A. Wilhelm (57) ABSTRACT

A method and apparatus of managing a network connection of a network node comprising a NIC of a first type and a NIC of a second type. The method comprises: creating an interface device in the network node and setting the interface device to exchange data with a bridge connected to the NIC of the first type in response to detection of a failure in the NIC of the first type; determining a secondary node; instructing the secondary node to create and set a corresponding interface device; constructing a data channel between the interface device and the corresponding interface device, such that the data channel is capable of conducting data transmission using a network formed by the NICs of the second type. The apparatus corresponds to the above method.

19 Claims, 4 Drawing Sheets

(56) References Cited

U.S. PATENT DOCUMENTS

| | | |
|---|---|---|
| 2013/0033981 A1 | 2/2013 | Droux et al. |
| 2014/0040659 A1* | 2/2014 | Wassermann ....... G06F 11/2005 714/4.21 |
| 2014/0358985 A1* | 12/2014 | Kotecha .............. H04L 65/1063 709/202 |

OTHER PUBLICATIONS

Potharaju et al., "An Empirical Analysis of Intra- and Inter-Datacenter Network Failures for Geo-Distributed Services," SIGMETRICS'13, Jun. 2013, pp. 335-336.

* cited by examiner

MANAGING NETWORK CONNECTION OF A NETWORK NODE

CROSS-REFERENCE TO RELATED APPLICATIONS

This application is based on and claims the benefit of priority from Chinese Patent Application 201310487665.5, filed on Oct. 17, 2013.

BACKGROUND

The present invention relates to network node and network connection, and more specifically, to a method and apparatus of managing network connection of a network node.

A traditional computer network is consisted of a plurality of interconnected computers, in which each physical computer entity acts as a node of the network. With the development in virtualization, a physical computing platform may have hypervisor running thereon and then have Virtual Machines installed on the hypervisor. A Virtual Machine (VM) is capable of providing various applications and services just like a real standalone computer. Since a VM acquires its running environment completely via software simulation, a plurality of VMs may be installed on a same physical computing platform, and the plurality of VMs may run concurrently independent to and isolated from each other. In this case, such physical computing platform is often regarded as a network node. In cloud environment, a network is typically formed by interconnecting a plurality of physical computing platforms as above.

Figure 1:
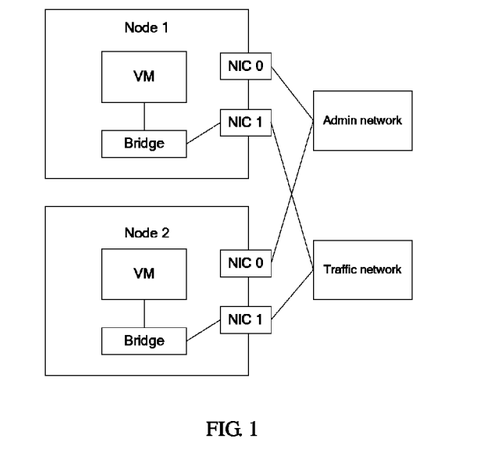
FIG. 1 illustratively shows two network nodes in a network.

FIG. 1 illustratively shows two network nodes in a network. The two network nodes are shown as node 1 and node 2, respectively. As mentioned above, several VMs may be installed on each node to provide necessary applications and services. As is known to those skilled in the art, a node connects to the network via a network card, that is, network interface card (NIC). In a typical network environment, as shown in FIG. 1, each network node at least has two types of NIC, that is, NIC 0 and NIC 1, wherein NIC 0 is for an administrator to conduct network management and is also referred to as administration NIC; NIC 1 is for transmission of traffic data of VMs and is also referred to as traffic NIC. Both administration NICs of the two nodes are connected to an administration network to transmit internal administration data including, for example, administration configuration data, API invoke instructions, image data, etc., while both traffic NICs are connected to a VM traffic network to transmit business traffic data of the VMs. Inevitably, after being used for a period of time, a NIC has certain failure probability. For example, assuming NIC 1 for traffic data on a node fails, all VMs carried by that node will be inaccessible from outside at this point, and data transmission related to applications running on these VMs will be interrupted, thereby influencing provision of VM services.

To avoid or alleviate influence caused by failure of a NIC, in prior art, data of the failed NIC is transferred by methods such as multi-NIC in group, NIC bonding, link aggregation, etc. However, these methods basically require additional NIC and/or switch in hardware. In practice, it is quite difficult to complete hardware switch or replacement in a short time. Furthermore, it takes a certain time window for an administrator to become aware of the NIC failure. Therefore, using these methods in the art, it is difficult to solve the problem that data of the failed NIC would be interrupted before the administrator comes to know the failure of the NIC and to complete the hardware replacement.

SUMMARY

The present invention is proposed in view of the above problem, the purpose of which is to avoid or alleviate influence of NIC failure on network data transmission by managing network connection of a network node.

According to one embodiment of the present invention, there is provided a method of managing network connection of a network node, which network node at least has a network card NIC of a first type and a network card NIC of a second type, the method comprising: creating an interface device in the network node and setting the interface device to exchange data with a bridge connected to the NIC of the first type in response to detection of a failure in the NIC of the first type; determining a secondary node, which is connected to the network node and at least has a NIC of the first type and a NIC of the second type that are both in normal operating state; instructing the secondary node to create a corresponding interface device therein and to set the corresponding interface device to exchange data with the NIC of the first type in the secondary node; constructing a data channel between the interface device and the corresponding interface device, such that the data channel is capable of conducting data transmission using a network formed by the NICs of the second type.

According to another embodiment of the present invention, there is provided an apparatus of managing network connection of a network node, which network node at least has a NIC of a first type and a NIC of a second type, the apparatus comprising: a creation unit configured to create an interface device in the network node and set the interface device to exchange data with a bridge connected to the NIC of the first type in response to detection of a failure in the NIC of the first type; a determination unit configured to determine a secondary node, which is connected to the network node and at least has a NIC of the first type and a NIC of the second type that are both in normal operating state; an instruction unit configured to instruct the secondary node to create a corresponding interface device therein and to set the corresponding interface device to exchange data with the NIC of the first type in the secondary node; a construction unit configured to construct a data channel between the interface device and the corresponding interface device, such that the data channel is capable of conducting data transmission using a network formed by the NICs of the second type.

With the above method and apparatus, when there is a failure in NIC of a network node, data related to the failed NIC may be immediately transferred to a secondary node and data transmission is realized with the aid of the secondary node, thereby avoiding interruption in network data transmission.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
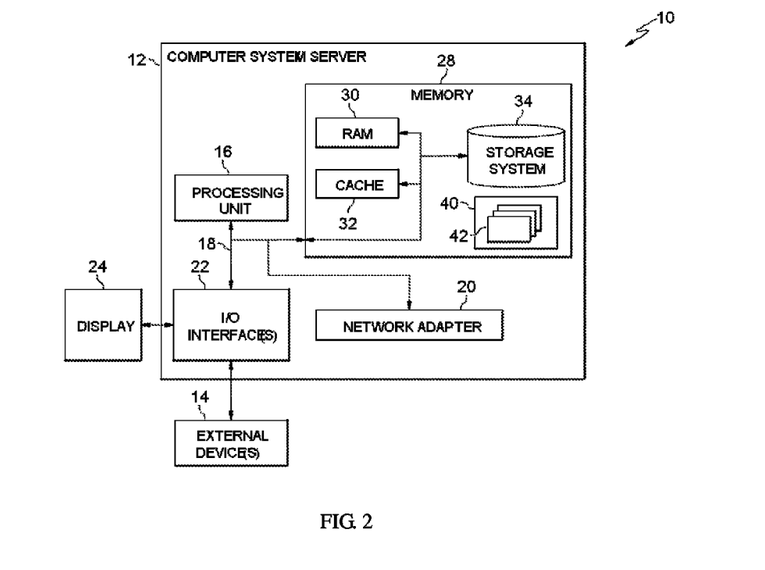
FIG. 2 shows a block diagram of an exemplary computer system/server 12 which is applicable to implement the embodiments of the present invention.

Referring now to FIG. 2, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 2, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Embodiments of the invention will be described below in conjunction with accompany drawings. In various embodiments of the invention, once a failure of a NIC in a network node is detected, an interface device is created to take over data of a bridge connected to the failed NIC. Furthermore, a "healthy" node under normal network connection state is found in the network to be taken as a secondary node, and a corresponding interface device is created in the secondary node. Then, data originally to be transmitted via the failed NIC is transmitted between the interface device in the failed node and the corresponding interface device in the secondary node by using network connection of normal NICs. Implementation of the above inventive concept will be described below with reference to accompany drawings and examples.

Figure 3:
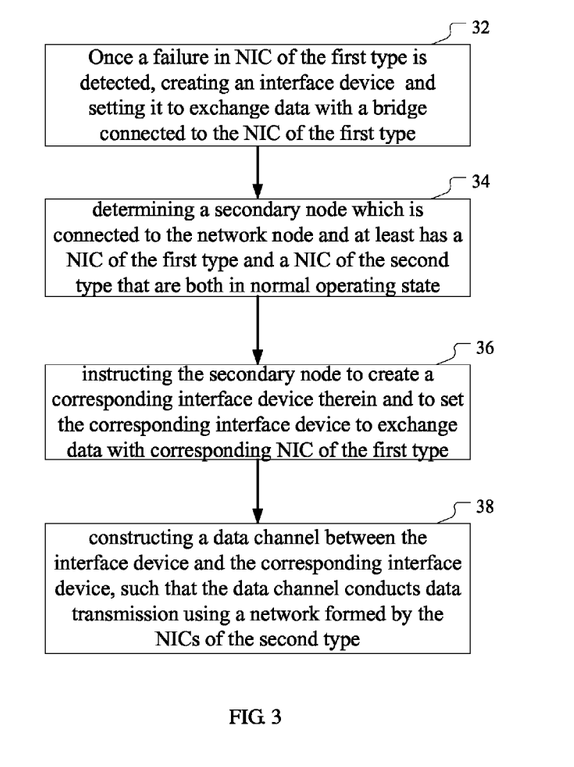
FIG. 3 shows a flowchart of a method of managing network connection of a network node according to an embodiment of the invention.

Referring now to FIG. 3, a flowchart of a method of managing network connection of a network node is shown according to an embodiment of the invention. The network node applying the method at least has a NIC of a first type and a NIC of a second type. According to this embodiment, the method of managing network connection of the network node comprises: step 32 of creating an interface device in the network node and setting the interface device to exchange data with a bridge connected to the NIC of the first type in response to detection of a failure in the NIC of the first type; step 34 of determining a secondary node, which is connected to the network node and at least has a NIC of the first type and a NIC of the second type that are both in normal operating state; step 36 of instructing the secondary node to create a corresponding interface device therein and to set the corresponding interface device to exchange data with the NIC of the first type in the secondary node; and step 38 of constructing a data channel between the interface device and the corresponding interface device, such that the data channel is capable of conducting data transmission using a network formed by the NICs of the second type.

It is appreciated that, a network node applying the above method shall have a plurality of NICs, which are used for different purposes and connected to different types of network. For example, NIC 0 as shown in FIG. 1 is for purpose of network management and is connected to an administration network; and NIC 1 is for purpose of transmitting VM traffic data and is thus connected a traffic network. In embodiments of the invention, NICs used for different purposes and connected to different types of network are referred to as NICs of different types. For ease of description and convenience, it is assumed that the network node at least has a NIC of a first type and a NIC of a second type. It is appreciated that, however, the network node may have more types of and larger number of NICs. Furthermore, a NIC of a first/second type is not limited to one physical NIC; rather, it may be embodied as a collection of a plurality of physical NICs that are bonded together.

In one embodiment, before step 32, the method further comprises: detecting operating condition of each NIC in the network node. Specifically, the detection may be performed periodically at a predefined time interval. In particular, the detection can be achieved by periodically issuing a query message, and determining operating state of the NICs according to receipt condition of reply message. There have proposed many approaches of monitoring or detecting NICs in the art. Here, detection of operating state of NIC may be performed by using any existing appropriate method.

Once a failure of a NIC is detected in the network node, steps 32-38 are performed to transfer data related to the failed NIC. First, at step 32, in response to detection of a failure of the NIC of the first type, an interface device is created in the network node and the interface device is set to exchange data with a bridge connected to the NIC of the first type. It is appreciated that, the above NIC of the first type refers to the failed NIC in the network node. In practice, the traffic NIC for transmitting VM traffic data is prone to have failure due to frequent use and high throughput, etc. Therefore, detailed implementation of various steps will be described below in conjunction with a scenario in which a failure occurs in a traffic NIC.

Figure 4A:
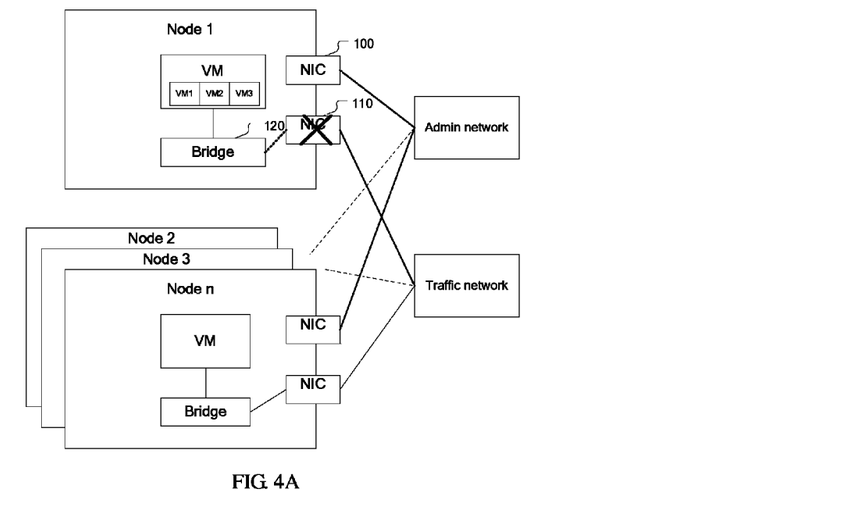
FIGS. 4A-4C show diagram of network connection state of network nodes.
Figure 4B:
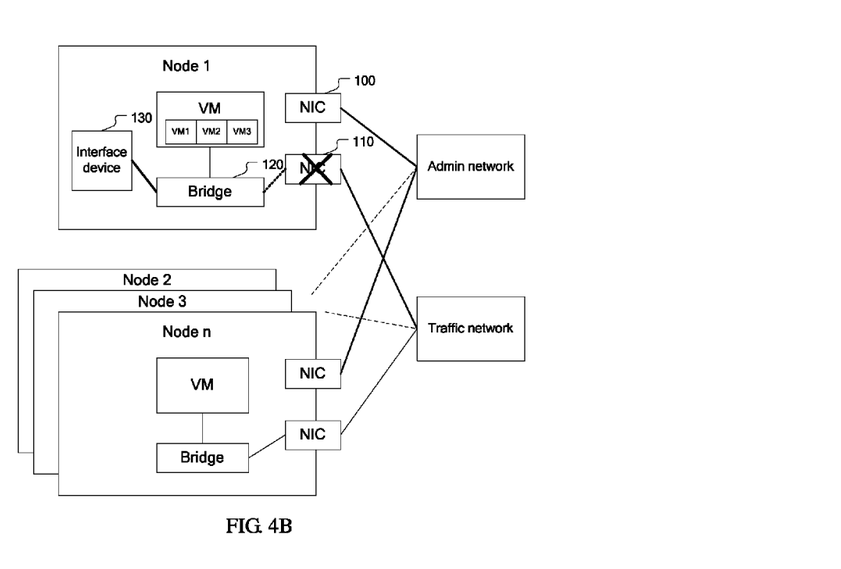
Figure 4C:
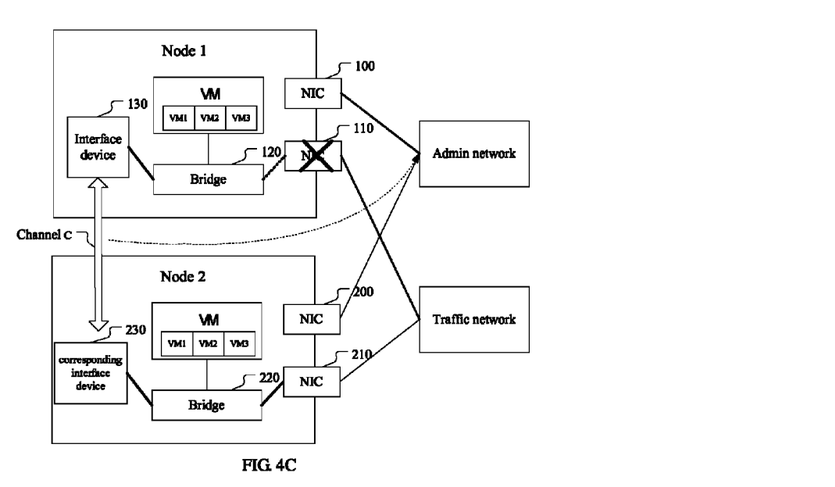

FIGS. 4A-4C show diagram of network connection state of network nodes. First, referring to FIG. 4A, a current network node is represented as node 1. A plurality of VMs, that is, VM1-VM3, are installed on node 1. There are also other network nodes in the network, such as node 2, 3, . . . , n. Furthermore, similar to FIG. 1, it is assumed that node 1 has two types of NIC, which are denoted as NIC 100 and NIC 110. NIC 100 is an administration NIC for network management, and NIC 110 is a traffic NIC for VM traffic data.

Those skilled in the art will appreciate that, to make a VM operate just like a real standalone computer, the VM is provided with a virtual NIC via software simulation. To conduct data forwarding between virtual NIC and physical NIC of a VM, generally a bridge is provided at hypervisor layer. The bridge is a virtual bridge with VLAN bridge ports connected to virtual NIC of a VM. Such connection is also referred to as virtual station interface (VSI). At the other side, the bridge is connected to physical NIC, so as to transmit data between VM and physical NIC. In the example of FIG. 4, since NIC 110 is used to transmit traffic data of the VMs, under normal operating state, a bridge 120 associated with the VMs is connected to the traffic NIC 110, and then to the VM traffic network via that NIC 110.

As mentioned above, assume at a certain point in time, the NIC 110 for VM traffic data fails. That is to say, in this embodiment, the NIC of the first type in step 32 is a traffic NIC. Accordingly, as shown in FIG. 4A, data transmission between traffic NIC 110 and bridge 120 is broken. Then, according to step 32, in response to detection of the failure of the traffic NIC, an interface device 130 is created in the network node and the interface device 130 is set to exchange data with the bridge 120 connected to the traffic NIC 110, as shown in FIG. 4B. It is appreciated that, here, the bridge 120 is a bridge already existed in the network node and associated with the VMs.

In one embodiment, the above interface device 130 comprises a TAP device. The TAP device is an Ethernet virtual device implemented via software, which manipulates network's layer 2 data packets such as Ethernet data frames, and encapsulates the data packets in some forms. Via the TAP device, an operating system may send data to a program in user space to which the TAP device is bounded, whereas a program in user space may also send data via the TAP device just like operating a hardware network device. In the latter scenario, the TAP device delivers (or 'injects') data packets to network stack of the operating system, thereby simulating the process of receiving data from outside. In other words, a TAP device provides reception and transmission of data packets for program in user space.

The above TAP device may be inserted in the bridge 120, so that it is connected to the bridge 120. Specifically, the above TAP device may be configured as a port of the bridge 120, so that connection between the TAP device and the bridge 120 is realized. Thus, the TAP device is set to exchange data with the bridge 120.

In another embodiment, the above interface device 130 comprises a TUN device. The TUN device has functions similar to that of a TAP device, except that the TUN device is a point-to-point virtual device implemented via software, manipulates layer 3 data packets such as IP data packets, and conducts different forms of encapsulation on data packets. The TUN device can be similarly inserted in a bridge, so that it is connected to the bridge and exchange data therewith.

In other embodiments, other software devices having similar functions, such as data encapsulation, data forwarding etc., may also be employed as the above interface device. Furthermore, in addition to the above embodiments in which an interface device is created by configuring an existing device, new software device may also be designed to serve as the above interface device according to configuration features of the bridge.

As illustrated by FIG. 4, the resulting interface device 130 is connected to the bridge 120. Due to failure of traffic NIC 110, data transmission between the bridge 120 and the traffic NIC 110 is broken; accordingly, traffic data exchanged between the bridge 120 and the VMs is switched to the interface device 130.

On the other hand, at step 34, a secondary node is determined, which is connected to current network node and at least has a NIC of the first type and a NIC of the second type that are both in normal operating state. To determine the secondary node, in one embodiment, first, at least one 'healthy' node connected to the current network node is determined, wherein the healthy node is a node in which both a NIC of the first type and a NIC of the second type are in normal operating state. It is appreciated that, although the NIC of the first type in the current network node fails, the network node still can connect to network via the NIC of the second type. In the case mentioned above that failure occurs in the traffic NIC, the current network node can connect to administration network via the administration NIC, and then can learn network connection state information (also referred to as 'health' condition) of other network nodes. From such network connection state information, healthy nodes can be determined among other network nodes connected to the current network node. Then, at least one node is selected from the healthy nodes to serve as the above secondary node. In one embodiment, one node is randomly selected from the healthy nodes as the secondary node. In another embodiment, such a node which is not selected yet by any other network node as secondary node is selected from the healthy nodes as secondary node of the current network node. In yet another embodiment, a node with relative high network quality is selected from the healthy nodes as the secondary node, wherein network quality may be evaluated by criterion such as NIC performance parameter, network bandwidth etc. In one embodiment, a plurality of nodes may be selected as secondary node. Although the following description is made in conjunction with an example of a single secondary node, the manner of operating the secondary node is also applicable to the case in which there are multiple secondary nodes.

On basis that the secondary node has been determined, at step 36, the current network node issues a notification to the secondary node, to instruct the secondary node to create a corresponding interface device therein and to set the corresponding interface device to exchange data with the NIC of the first type in the secondary node. As mentioned above, although the current network node has its NIC of the first type failed, it can still connect to network via the NIC of the second type. Therefore, at step 36, the current network node can issue a notification to the secondary node by using the NIC of the second type, which instructs the secondary node to create therein a corresponding interface device that corresponds to the interface device in the current network node and to set the corresponding interface device. Specifically, the above notification may instruct the secondary node to set the created corresponding interface device to exchange data with the NIC of the first type of that secondary node.

After receiving the notification issued by the current network node, the secondary node may create and set a corresponding interface device according to the instruction in the notification. The process of creating and setting the corresponding interface device by the secondary node may be similar with and corresponds to that of creating and setting an interface device by current network node in step 32. As stated above, the interface device created in step 32 may be embodied as multiple forms. Regardless of what form is being employed, the corresponding interface device created by the secondary node in step 36 should be consistent with the interface device created by the current network node in step 32. In case a bridge is connected to the NIC of the first type in the secondary node, the corresponding interface device is set to exchange data with the NIC of the first type via that bridge.

Next, a description will be made in conjunction with the example of FIG. 4. In the example of FIG. 4, in addition to the current network node 1, there are also other network nodes 2, 3, . . . n in the network, which are all connected to the current network node 1. The healthy nodes in these network nodes may all be taken as secondary node. In one example, assume node 2 is determined as the secondary node, as shown in FIG. 4C. Then, the current network node 1 in which a failure occurs in traffic NIC 110 issues a notification to the secondary mode 2, instructing the secondary mode 2 to create and set a corresponding interface device. According to this notification, the secondary node 2 creates therein a corresponding interface device 230 and sets the corresponding interface device 230 to exchange data with a corresponding traffic NIC 210. Specifically, since traffic NIC 210 of the secondary node 2 similarly conducts traffic data transmission via a bridge 220, the corresponding interface device 230 is set to connect to that bridge 220 and thus connect to the traffic NIC 210 via that bridge 220 to exchange data therewith. It is appreciated that, similar to that in the current network node 1, the above bridge 220 in the secondary node 2 is an existing bridge for forwarding VM traffic data. Furthermore, the corresponding interface device 230 in the secondary node 2 is consistent with the interface device 130 in the current network node 1.

On the basis that the interface device and the corresponding interface device have been created respectively, at step 38, a data channel is constructed between the interface device and the corresponding interface device, such that data transmission can be conducted through the data channel using a network formed by the NICs of the second type.

In one embodiment, the step of constructing the data channel between the interface device and the corresponding interface device comprises establishing a network tunnel taking the interface device and the corresponding interface device as endpoints and forming the data channel by utilizing the network tunnel. It is appreciated by those skilled in the art that, network tunneling is a technology of using a network protocol to transfer data in another network protocol. According to this technology, first, original data packets are re-encrypted and encapsulated into another data packet via a special protocol, and then the new data packet is transmitted in a tunnel. The above transmission may be realized via transport protocol of public network (such as TCP/IP), for example. When the data packet arrives at the other side of the tunnel, it is first verified in digital signature, and then decapsulated into its original form. In the scenario of the present embodiment, a network tunnel is established between the interface device in the current network node and the corresponding interface device in the secondary node by using network tunneling technology. As such, data packets (which may be encapsulated through one protocol) originally transmitted via the NIC of the first type are transmitted between the interface device and the corresponding interface device by using a network (which may utilize another protocol) formed by the NICs of the second type. Some existing Virtual Private Networks (VPN) performs encapsulation of tunnel data packets based on TAP/TUN device. Thus, in case that interface device is formed by TAP/TUN device, a tunnel can be directly established between the interface device and the corresponding interface device. Since network tunneling technology is well-known in the art, specific process of establishing a tunnel will not be described here in detail.

In another embodiment, the step 38 of constructing a data channel between the interface device and the corresponding interface device comprises setting up a socket connection between the interface device and the corresponding interface device and forming the data channel by utilizing the socket connection. Those skilled in the art will appreciate that, to differentiate different processes and connections of application programs, various application programs are generally provided with interfaces called socket to interact with TCP/IP protocol. In the scenario of the present embodiment, the interface device in the current network node and the corresponding interface device in the secondary node may be taken as endpoints of bidirectional communication, and a socket is assigned to communication connection between each interface device and the NIC of the second type, thereby setting up a socket connection. This socket connection conducts session and performs duplication and transmission of data between the interface device and the corresponding interface device through a network formed by the NICs of the second type. As socket connection is a connection manner commonly used in the art, specific process of establishing a socket connection will not be described here in detail.

In still another embodiment, the step 38 of constructing a data channel between the interface device and the corresponding interface device comprises forming a shared file system between the interface device and the corresponding interface device and building the data channel by utilizing the shared file system. The shared file system may conduct data transmission using a network formed by the NICs of the second type.

It is appreciated that, in addition to the above listed approaches, other manners may also be employed to construct a data channel between the interface device and the corresponding interface device, such as in a manner of a message queue or Remote Procedure Call (RPC), etc. Other construction manners employed by those skilled in the art upon reading the description should also be considered to be within conceptive scope of the invention.

Since an effective data channel has been constructed between the interface device and the corresponding interface device, data originally transmitted via the NIC of the first type in the current network node can now be transferred to the NIC of the first type in the secondary node via the interface device and the corresponding interface device, and then transmitted to corresponding network of the first type via the NIC of the first type in the secondary node. Data transmission path will be described below in conjunction with the example of FIG. 4C.

As shown in FIG. 4C, a data channel C is created between an interface device 130 in the current network node 1 and a corresponding interface device 230 in the secondary node 2. In case that a failure occurs in traffic NIC 110 of node 1, data transmission between bridge 120 and the traffic NIC 120 is broken. On the other hand, since the interface device 130 created in node 1 is connected to the bridge 120, the interface device 130 takes over data of the bridge 120 originally transmitted via the traffic NIC 110. Specifically, for uplink traffic data from VM terminals to traffic network, first, in the current network node 1, the interface device 130 acquires the uplink traffic data from the bridge 120, and then transmits the data to the corresponding interface device 230 in the secondary node 2 through the data channel C using an administration network formed by administration NICs. In the secondary node 2, the corresponding interface device 230 is connected to the traffic NIC 210 via the bridge 220. Therefore, the bridge 220 can obtain the uplink traffic data of node 1 from the corresponding interface device 230 and forward such uplink traffic data along with traffic data of its local VMs to the traffic NIC 210 and in turn to the traffic network. Thus, sending of uplink traffic data in the current network node is realized with the help of the secondary node. Next, data flow of downlink traffic data from traffic network to VM terminals will be described. First, the traffic NIC 210 of the secondary node 2 receives traffic data from the traffic network and forwards it to the bridge 220. The bridge 220 forwards traffic data belonging to local VMs to corresponding VMs, and transmits remaining traffic data to the corresponding interface device 230. By using the data channel C, the interface device 130 in the current network node 1 may obtain the downlink traffic data from the corresponding interface device 230. Then, the interface device 130 forwards the downlink traffic data to the bridge 120 and the bridge 120 distributes the data to respective VMs. Through the above process, in case that a failure occurs in traffic NIC of the current network node, traffic data of VMs is transferred to the secondary node by using a network formed by administration NICs, and is transmitted to the traffic network by the traffic NIC of the secondary node.

Steps 32-38 have been described above in conjunction with an example in which there is a failure in traffic NIC. However, the method of embodiments of the invention is not only applicable to the case of failure in traffic NIC, but also applicable to the case in which a failure occurs in other types of NIC. For example, in case that a failure occurs in an administration NIC, an interface device is similarly created in step 32. However, the difference is that an administration NIC generally transmits data directly to the administration system of the node without being connected to a bridge. To this end, a virtual bridge may be generated for simulating network configuration of the administration NIC, such as gateway, routing table, ip table etc. Then, the created interface device may be set to exchange data with that virtual bridge. Then, the interface device may similarly acquire administration data from the virtual bridge, and transmit the administration data to the corresponding interface device of the secondary node by using a network formed by NICs of another type (such as traffic NIC). In turn, the corresponding interface device transmits the above administration data to the administration network via the administration NIC in the secondary node that operates normally. In one implementation, the corresponding interface device in the secondary node may directly communicate with the administration NIC without generating a virtual bridge. For NIC of other types, in case that no bridge is directly connected thereto, a virtual bridge may similarly be generated first when a failure occurs in that NIC, and then data originally transmitted through that failing NIC can be switched to the created interface device via that virtual bridge.

Through the above manners, when there is a failure in NIC of a network node, data related to the failed NIC may be immediately transferred to a secondary node by means of software, and transmitted with the aid of the secondary node, thereby avoiding interruption in data transmission.

Figure 5:
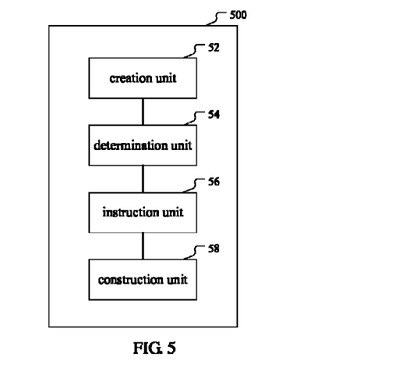
FIG. 5 shows a block diagram of an apparatus of managing network connection of a network node according to an embodiment of the invention.

Based on a same inventive conception, the present invention also provides an apparatus of managing network connection of a network node. FIG. 5 shows a block diagram of an apparatus according to an embodiment of the invention. As shown, the apparatus of managing network connection of a network node is generally denoted as 500, wherein the network node at least has a NIC of a first type and a NIC of a second type. Specifically, the apparatus 500 comprises: a creation unit 52 configured to create an interface device in the network node and set the interface device to exchange data with a bridge connected to the NIC of the first type in response to detection of a failure in the NIC of the first type; a determination unit 54 configured to determine a secondary node which is connected to the network node and at least has a NIC of the first type and a NIC of the second type that are both in normal operating state; an instruction unit 56 configured to instruct the secondary node to create a corresponding interface device therein and to set the corresponding interface device to exchange data with the NIC of the first type in the secondary node; and a construction unit 58 configured to construct a data channel between the interface device and the corresponding interface device, such that the data channel is capable of conducting data transmission using a network formed by the NICs of the second type.

According to one embodiment, the NIC of the first type is a traffic NIC for transmitting virtual machine traffic data, and the bridge is a bridge associated with virtual machines in the network node.

According to another embodiment, the NIC of the first type is an administration NIC for transferring administration data, and the creation unit 52 is further configured to generate a virtual bridge in the network node as the bridge connected to the NIC of the first type in response to detection of the failure in the NIC of the first type, wherein the virtual bridge is used to simulate network configuration of the NIC of the first type in the network node.

In one embodiment, the interface device comprises at least one of a TAP device and a TUN device.

According to one embodiment, the determination unit 54 is configured to: determine at least one healthy node connected to the network node, wherein the healthy node is a node in which both a NIC of the first type and a NIC of the second type are in normal operating state; select at least one node from the at least one healthy node as the secondary node.

According to one embodiment, the construction unit 58 is configured to: establish a network tunnel taking the interface device and the corresponding interface device as endpoints and form the data channel by utilizing the network tunnel, wherein the network tunnel conducts data transmission using a network formed by the NICs of the second type.

According to one embodiment, the construction unit 58 is configured to: set up a socket connection between the interface device and the corresponding interface device and form the data channel by utilizing the socket connection, wherein the socket connection conducts data transmission using a network formed by the NICs of the second type.

According to one embodiment, the construction unit 58 is configured to: form a shared file system between the interface device and the corresponding interface device and build the data channel by utilizing the shared file system, wherein the shared file system conducts data transmission using a network formed by the NICs of the second type.

In one embodiment, the apparatus 500 resides within a managed network node.

It is appreciated that detailed implementation of various units in the apparatus 500 of FIG. 5 corresponds to description of various steps made in conjunction with detailed examples, which will be omitted here for brevity.

With the method and apparatus of the above described embodiments, when there is a failure in NIC of a network node, data related to the failed NIC may be immediately transferred to a secondary node and data transmission is realized with the aid of the secondary node, thereby avoiding interruption in network data transmission. As such, availability of network data can be guaranteed even if a failure occurs in NIC, thereby providing allowance for repairing or physical replacement of the failing NIC.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing network connection of a network node comprising a first network interface card (NIC) of a first type and a second NIC of a second type, the method comprising:
    creating a first interface device in the network node and setting the first interface device to exchange data with a bridge connected to the first NIC of the first type in response to detection of a failure in the first NIC of the first type;
    determining a secondary node which is connected to the network node and at least has a third NIC of the first type and a fourth NIC of the second type that are both in a normal operating state;
    instructing the secondary node to create a second interface device therein and to set the second interface device to exchange data with the third NIC of the first type in the secondary node; and
    constructing a data channel between the first interface device and the second interface device, such that the data channel is capable of conducting data transmission using a network formed by the second and fourth NICs of the second type.

2. The method of claim 1, wherein the first NIC of the first type is a traffic NIC for transmitting virtual machine traffic data, and the bridge is a bridge associated with virtual machines in the network node.

3. The method of claim 2, wherein the bridge is coupled to (i) a virtual NIC of a virtual machine and (ii) the first NIC of the first type.

4. The method of claim 1, wherein the first NIC of the first type is an administration NIC for transmitting administration data, the method further comprising:
    generating a virtual bridge in the network node as the bridge connected to the first NIC of the first type in response to detection of the failure in the first NIC of the first type, wherein the virtual bridge is used to simulate network configuration of the first NIC of the first type in the network node.

5. The method of claim 1, wherein the interface device comprises at least one of a TAP device and a TUN device.

6. The method of claim 1, wherein determining a secondary node comprises:
    determining at least one healthy node connected to the network node, wherein the healthy node is a node in which both the third NIC of the first type and the fourth NIC of the second type are in normal operating state; and
    selecting at least one node from the at least one healthy node as the secondary node.

7. The method of claim 1, wherein constructing a data channel between the first interface device and the second interface device comprises:
    establishing a network tunnel taking the first interface device and the second interface device as endpoints and forming the data channel by utilizing the network tunnel, wherein the network tunnel conducts data transmission using a network formed by the second and fourth NICs of the second type.

8. The method of claim 1, wherein constructing a data channel between the first interface device and the second interface device comprises:
    setting up a socket connection between the first interface device and the second interface device and forming the data channel by utilizing the socket connection, wherein the socket connection conducts data transmission using a network formed by the second and fourth NICs of the second type.

9. The method of claim 1, wherein constructing a data channel between the first interface device and the second interface device comprises:
    forming a shared file system between the first interface device and the second interface device and building the data channel by utilizing the shared file system, wherein the shared file system conducts data transmission using a network formed by the second and fourth NICs of the second type.

10. An apparatus of managing network connection of a network node, which network node at least has a first network interface card (NIC) of a first type and a second NIC of a second type, the apparatus comprising:
- a creation unit configured to create a first interface device in the network node and set the first interface device to exchange data with a bridge connected to the first NIC of the first type in response to detection of a failure in the first NIC of the first type;
- a determination unit configured to determine a secondary node which is connected to the network node and at least has a third NIC of the first type and a fourth NIC of the second type that are both in normal operating state;
- an instruction unit configured to instruct the secondary node to create a second interface device therein and to set the second interface device to exchange data with the third NIC of the first type in the secondary node; and
- a construction unit configured to construct a data channel between the first interface device and the second interface device, such that the data channel is capable of conducting data transmission using a network formed by the second and fourth NICs of the second type.

11. The apparatus of claim 10, wherein the first NIC of the first type is a traffic NIC for transmitting virtual machine traffic data, and the bridge is a bridge associated with virtual machines in the network node.

12. The apparatus of claim 11, wherein the bridge is coupled to (i) a virtual NIC of a virtual machine and (ii) the first NIC of the first type.

13. The apparatus of claim 10, wherein the first NIC of the first type is an administration NIC for transmitting administration data, the creation unit is further configured to generate a virtual bridge in the network node as the bridge connected to the first NIC of the first type in response to detection of the failure in the first NIC of the first type, wherein the virtual bridge is used to simulate network configuration of the first NIC of the first type in the network node.

14. The apparatus of claim 10, wherein the interface device comprises at least one of a TAP device and a TUN device.

15. The apparatus of claim 10, wherein the determination unit is configured to:
- determine at least one healthy node connected to the network node, wherein the healthy node is a node in which both the third NIC of the first type and the fourth NIC of the second type are in normal operating state; and
- select at least one node from the at least one healthy node as the secondary node.

16. The apparatus of claim 10, wherein the construction unit is configured to:
- establish a network tunnel using the first interface device and the second interface device as endpoints and form the data channel by utilizing the network tunnel, wherein the network tunnel conducts data transmission using a network formed by the second and fourth NICs of the second type.

17. The apparatus of claim 10, wherein the construction unit is configured to:
- set up a socket connection between the first interface device and the second interface device and form the data channel by utilizing the socket connection, wherein the socket connection conducts data transmission using a network formed by the second and fourth NICs of the second type.

18. The apparatus of claim 10, wherein the construction unit is configured to:
- form a shared file system between the first interface device and the second interface device and build the data channel by utilizing the shared file system, wherein the shared file system conducts data transmission using a network formed by the second and fourth NICs of the second type.

19. A computer program product comprising a non-transitory computer readable storage medium having stored thereon program code that is configured to perform, when executed by a data processor, the method of claim 1.

* * * * *